US012675038B2

(12) United States Patent
Kim

(10) Patent No.: US 12,675,038 B2
(45) Date of Patent: Jul. 7, 2026

(54) PHOTOGRAPHIC DEVICE FOR PETS

(71) Applicant: KARMAN LINE, CORP., Seoul (KR)

(72) Inventor: Jong Min Kim, Seoul (KR)

(73) Assignee: KARMAN LINE, CORP., Seoul (KR)

( * ) Notice: Subject to any disclaimer, the term of this patent is extended or adjusted under 35 U.S.C. 154(b) by 62 days.

(21) Appl. No.: 18/858,820

(22) PCT Filed: Apr. 21, 2023

(86) PCT No.: PCT/KR2023/005430
§ 371 (c)(1),
(2) Date: Aug. 25, 2025

(87) PCT Pub. No.: WO2023/211060
PCT Pub. Date: Nov. 2, 2023

(65) Prior Publication Data
US 2026/0003259 A1      Jan. 1, 2026

(30) Foreign Application Priority Data

Apr. 28, 2022    (KR) ........................ 10-2022-0052970

(51) Int. Cl.
*G03B 30/00* (2021.01)
*A01K 1/035* (2006.01)
(Continued)

(52) U.S. Cl.
CPC .............. *G03B 30/00* (2021.01); *A01K 1/035* (2013.01); *H04N 1/00137* (2013.01);
(Continued)

(58) Field of Classification Search
CPC .. H04N 1/00137; H04N 1/00188; H04N 1/34; H04N 23/695; H04N 23/64;
(Continued)

(56) References Cited

U.S. PATENT DOCUMENTS 8,651,057 B1 * 2/2014 Welsh .................... A01K 61/90
                                                          119/215
2007/0172223 A1    7/2007 Eberhardt
2010/0188707 A1 * 7/2010 Gassman ............... G03B 15/00
                                                          358/1.18
2010/0296801 A1    11/2010 Lane
(Continued)

FOREIGN PATENT DOCUMENTS

JP        2006072611 A      3/2006
JP        2006184613 A      7/2006
(Continued)

OTHER PUBLICATIONS

Korean Office Action for KR 10-2022-0052970 issued on Apr. 18, 2024.

*Primary Examiner* — Kelly L Jerabek
(74) *Attorney, Agent, or Firm* — Dinsmore & Shohl LLP; Yongsok Choi, Esq.

(57) ABSTRACT

The present invention relates to a photographic device for pets that takes solo photos of pets, comprising an entrance formed on one side of the photographic device, a shooting room formed inside the photographic device, a main console provided within the shooting room that controls the operation of taking photographs, the viewing of the photos taken, and the photo output, a shooting platform where a user can place the pet, and a shooting unit comprising a lens for photographing the pet. The photographic device for pets of the present invention enables a user to enter the shooting room inside the device with a pet, position the pet on the shooting platform, and easily take and output solo photos of the pet from various angles.

12 Claims, 7 Drawing Sheets

(51) Int. Cl.

| | |
|---|---|
| *G07F 17/26* | (2006.01) |
| *H04N 1/00* | (2006.01) |
| *H04N 1/34* | (2006.01) |
| *H04N 23/60* | (2023.01) |
| *H04N 23/695* | (2023.01) |

(52) U.S. Cl.
CPC .......... *H04N 1/00188* (2013.01); *H04N 1/34*
(2013.01); *H04N 23/64* (2023.01); *H04N*
*23/695* (2023.01); *G07F 17/266* (2013.01)

(58) Field of Classification Search
CPC ... H04N 23/60; G07F 17/0014; G07F 17/266;
G06Q 20/18; A01K 1/035; G03B 30/00;
G03B 17/53; G03B 15/00; G03B 17/12;
G03B 17/56
See application file for complete search history.

(56) References Cited

U.S. PATENT DOCUMENTS

| | | | | |
|---|---|---|---|---|
| 2014/0052463 A1* | 2/2014 | Cashman | ............... | G16H 40/20 |
| | | | | 705/2 |
| 2023/0292705 A1* | 9/2023 | Snyder | .................. | G16H 20/60 |
| | | | | 119/51.02 |

FOREIGN PATENT DOCUMENTS

| | | | |
|---|---|---|---|
| JP | 2007-212573 | A | 8/2007 |
| JP | 3162544 | U | 9/2010 |
| KR | 10-2015-0030564 | A | 3/2015 |
| KR | 101671294 | B1 | 11/2016 |
| KR | 1020190095588 | A | 8/2019 |
| KR | 102238404 | B1 | 4/2021 |
| KR | 1020210092380 | A | 7/2021 |

* cited by examiner

PHOTOGRAPHIC DEVICE FOR PETS

CROSS-REFERENCE TO RELATED APPLICATIONS

This application is a national phase of International Application No. PCT/KR2023/005430 filed on Apr. 21, 2023, which claims priority to Korean Patent Application No. 10-2022-0052970, filed on Apr. 28, 2022, the entire contents of which are herein incorporated by reference.

TECHNICAL FIELD

The present invention relates to a photographic device for pets. More specifically, the present invention relates to a photographic device for pets designed to easily capture high-quality solo photos of pets.

BACKGROUND ART

By 2020, the number of pet owners in South Korea exceeded 10 million, and the pet-related market is steadily growing. As pets are increasingly recognized as a family member, there is a growing desire among consumers to capture and preserve the images of pets in photos.

As unmanned vending machines have become more common and diversified in recent years, unmanned photo booths have been installed and utilized in frequently visited places such as public institutions, subway stations, and amusement facilities. In an unmanned photo booth, a person who wants to take a photo inserts money into the coin slot of the photo booth to operate the photographic device. After the photo is taken, it is instantly printed and provided to the user in various forms, such as ID photos or sticker photos.

However, all existing commercial photo booths are designed for human subjects, and there is no known commercial photo booths specifically designed for taking solo photographs of pets. This means that if one wants to take a photo of your pet in an unmanned photo booth, they can hold their pet and take a photo together, but it is not easy for them to take a solo photo of their pet.

This is because when positioning a pet in the photo booth for a solo photo shoot, it is difficult to control the pet's movements to ensure a satisfactory composition, as the pet cannot control the photo shoot itself, nor can it look at the lens or pose at the moment of capture, and it constantly moves during the shoot. In addition, conventional photo booths have fixed camera lens positions designed to capture frontal views, and it is not possible to change the composition of the shot to capture the pet from different perspectives.

Housing systems designed to accommodate pets are known. Korean Patent Publication No. 10-2021-00923850 discloses a pet house system comprising an interior space in which a pet can be located, and a shooting unit for photographing the pet located in the interior space. In addition, Korean Registered Patent Publication No. 10-2238404 discloses a pet care unit comprising an interior space in which a pet can be located, and a video camera unit for photographing the interior space.

However, as photography in these conventional pet housing systems is limited to photographing the interior space of the housing to obtain behavioral or status information to protect the pets, it is inadequate for obtaining high-quality solo photographs of the pets. Moreover, these systems do not provide means for photographing the pets from various perspectives or controlling the pets☐ behavior, as it is sufficient to obtain behavioral or status information about the pets with them.

Consequently, despite the demand from consumers for high-quality solo photos of their pets, consumers currently must visit a professional studio and pay a high cost, and even then, it's difficult to get the composition they want. If a photographic device for pets that effectively controls the pet's movements and makes it easy to take solo photos of the pet, it could create a new market by fulfilling consumers' desire for high-quality pet photos to preserve their memories with pets.

PRIOR ART

Patent Literature (Patent Literature 1) Korean Patent Publication No. 10-2021-00923850

(Patent Literature 2) Korean Registered Patent Publication No. 10-2238404

SUMMARY

Technical Objective

The present invention is designed in consideration of the above circumstances, and the purpose of the present invention is to provide a photographic device that facilitates the taking of high-quality solo photos of pets.

Another purpose of the present invention is to provide a photographic device that can take pictures of a pet from various angles.

Another purpose of the present invention is to provide a device for taking photographs of a pet by placing the pet on a shooting platform in a position close to the user, thereby facilitating the taking of solo photographs of the pet while maintaining the pet's psychological comfort.

Another purpose of the present invention to provide a device that facilitates taking solo photographs of a pet by generating sound from a speaker located near the lens, or by hanging an object on an object rack between the lens and the pet to attract the pet's attention.

The technical objectives that the present invention seeks to solve are not limited to those mentioned above, and other technical objectives not specifically mentioned above will become apparent to one of ordinary skill in the art from the following descriptions.

Means for Solving Technical Objective

To implement the above-mentioned objectives, a photographic device of the present invention is capable of taking solo photos of pets, comprising; a shooting room formed inside the photographic device; a main console provided within the shooting room; a shooting platform where a user can place a pet; at least one shooting unit comprising a lens for photographing the pet; and a control unit, connected to the main console, for controlling the operation of the photographic device.

In one embodiment of the present invention, the present invention provides a photographic device for pets, characterized in that the shooting unit comprises: a frontal shooting unit positioned in front of the upper surface of the shooting platform comprising a frontal lens capable of photographing the pet from a frontal view; and a bottom shooting unit positioned on an interior side of the shooting platform comprising a bottom lens capable of photographing the pet from a bottom view; wherein the shooting unit is provided adjacent to one side of the main console.

In another embodiment of the present invention, the present invention provides a photographic device for pets, characterized in that the main console comprises a screen, a payment unit, a photo output unit, and a photo outlet.

In another embodiment of the present invention, the present invention provides a photographic device for pets, characterized in that the image captured by the frontal lens of the frontal shooting unit and the bottom lens of the bottom shooting unit is projected onto the screen equipped with the main console.

In another embodiment of the present invention, the present invention provides a photographic device for pets, characterized in that the frontal shooting unit comprises a plurality of frontal lenses and the bottom shooting unit comprises a plurality of bottom lenses, wherein the desired lens can be selected to take a photograph from the plurality of frontal lenses of the frontal shooting unit and the plurality of bottom lenses of the bottom shooting unit by operation of the main console.

In another embodiment of the present invention, the present invention provides a photographic device for pets, characterized in that the photographic device is equipped with a shooting angle adjustment unit for adjusting the shooting angle of the frontal lenses of the frontal shooting unit and the bottom lenses of the bottom shooting unit.

In another embodiment of the present invention, the present invention provides a photographic device for pets, characterized in that the photographic device is equipped with a movement means for moving the frontal shooting unit back and forth to adjust the distance to the pet positioned on the upper surface of the shooting platform.

In another embodiment of the present invention, the present invention provides a photographic device for pets, characterized in that a speaker for outputting sound by operation of the main console is disposed near the frontal lenses, the bottom lenses, or both.

In another embodiment of the present invention, the present invention provides a photographic device for pets, characterized by further comprising a vibration unit at the lower part of the shooting platform.

In another embodiment of the present invention, the present invention provides a photographic device for pets, characterized in that a mounting unit for mounting an object that guides the gaze of the pet between the frontal shooting unit and the shooting platform is disposed on the frontal shooting unit.

In another embodiment of the present invention, the present invention provides a photographic device for pets, characterized in that the photo output unit of the main console comprises a photo printing unit for printing the photos taken onto paper and delivering the printed photos to the photo outlet, and a transmission unit for transmitting the datafile of the photos taken to the user's mobile application.

In another embodiment of the present invention, the present invention provides a photographic device for pets, characterized in that the main console further comprises a remote control, wherein the remote control is used to perform some or all of the input functions of the main console.

In another embodiment of the present invention, the present invention provides a photographic device for pets, characterized in that background colors or patterns can be selected for the background of the captured image by operation of the main console.

Working Effect of the Invention

The photographic device for pets of the present invention is a device for taking solo photos of pets. The photographic device for pets of the present invention enables a person to enter a shooting room inside the photographic device with a pet and position the pet on a shooting platform, wherein camera lenses are positioned on the front and bottom of the pet on the shooting platform, and the user operates the main console to shoot, so that the pet can be photographed alone from various angles.

In this case, the shooting platform is located close to the user to provide psychological comfort to the pet. Further, the pet's gaze can be directed to facilitate high-quality solo photos of the pet can be taken easily by generating sound from speakers near the front and bottom lenses, by generating vibration at the lower part of the bottom shooting unit, or by mounting an object on the front shooting unit.

In particular, the photographic device for pets of the present invention enables a pet to be photographed from the bottom to the top, making it easy to obtain images of the pet's paws and the face of the pet (especially the nose part), which are typically difficult to achieve in general studio photography.

Furthermore, the photographic device for pets of the present invention is equipped with a vending machine for selling various items for pets on one side of the exterior, so that the user can flexibly cope with unexpected situations caused by pets, thereby additional income in addition to the income from photography can be generated. In addition, the photographic device for pets of the present invention is equipped with a billboard on the other side of the exterior that can display advertisements, which can attract the attention of users and generate additional income through displaying advertisements.

DETAILED DESCRIPTION OF THE INVENTION

The present invention is subject to various modifications and may have many different embodiments, and some specific embodiments are illustrated by way of figures to further explain the invention. However, this is not intended to limit the present invention to any particular embodiment and is to be understood to include all variations or modifications that fall within the spirit and technical scope of the present invention.

Hereinafter, embodiments of the technical idea of the invention will be described in detail with reference to the figures of the invention.

Figure 1A:
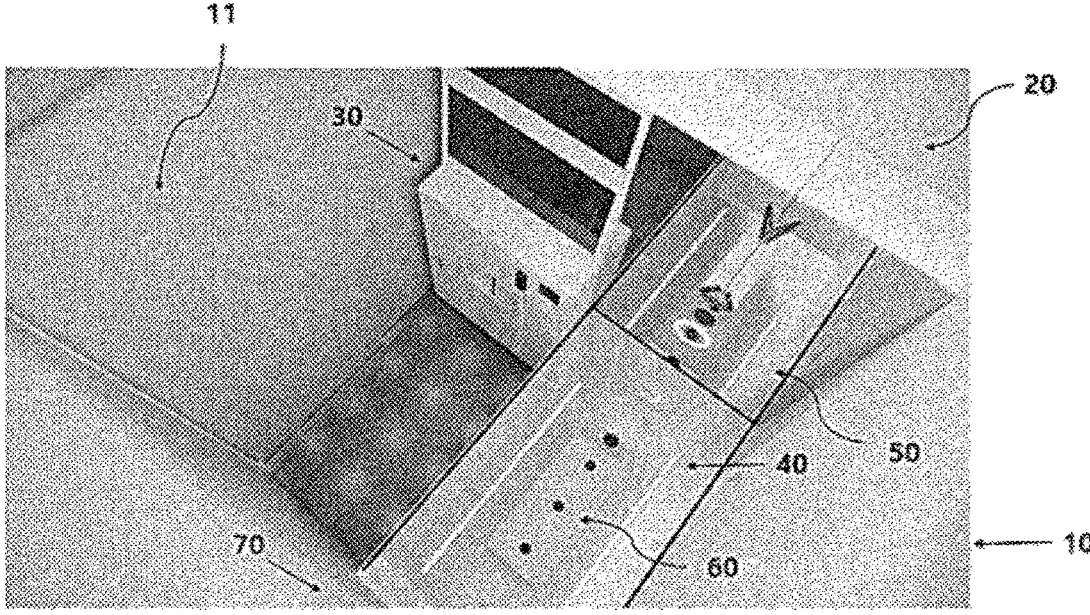
FIGS. 1a and 1b are images illustrating an interior view of the photographic device for pets according to the present invention.
Figure 1B:
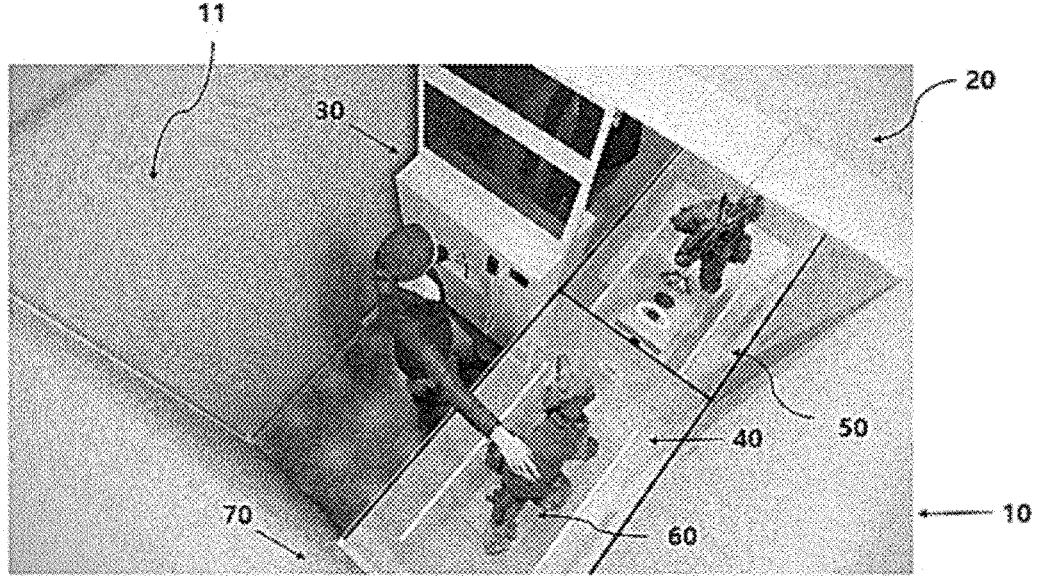

FIGS. 1a and 1b are images illustrating an interior view of the photographic device for pets (10) according to one embodiment of the present invention. Referring to FIG. 1a, the photographic device for pets (10) of the present invention has a shooting room (20) space formed inside, and an entrance (11) formed on one side allows a user and a pet to enter and exit the shooting room (20). The shooting room (20) is equipped with a main console (30), a shooting platform (40), a frontal shooting unit (50), a bottom shooting unit (60), and a wall surface (70). As shown in FIG. 1B, the shooting platform (40) is provided adjacent to one side of the main console (30), and a user can take a picture of the pet by operating the main console (30) while placing the pet on the shooting platform (40) located close to the user.

Figure 2A:
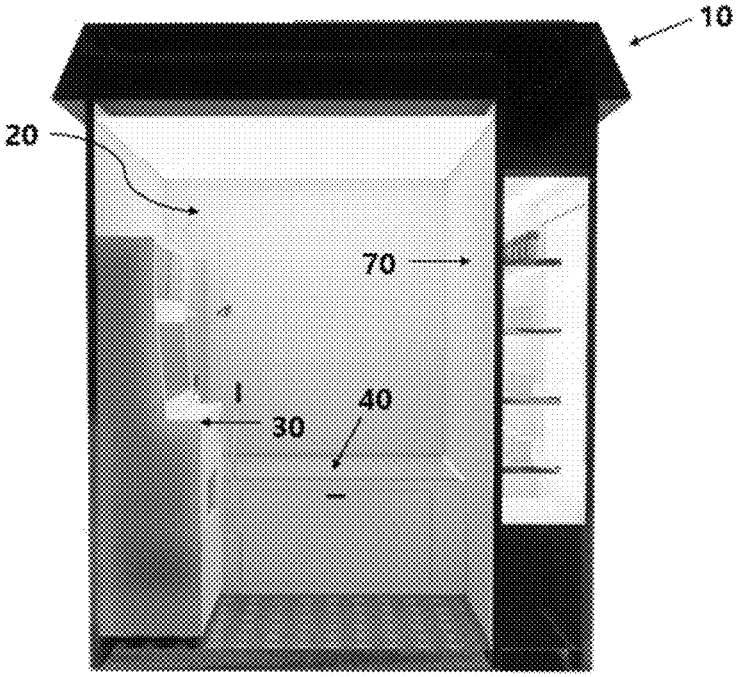
FIGS. 2a and 2b are images illustrating a perspective view from an exterior side of the interior of the photographic device for pets according to the present invention.
Figure 2B:
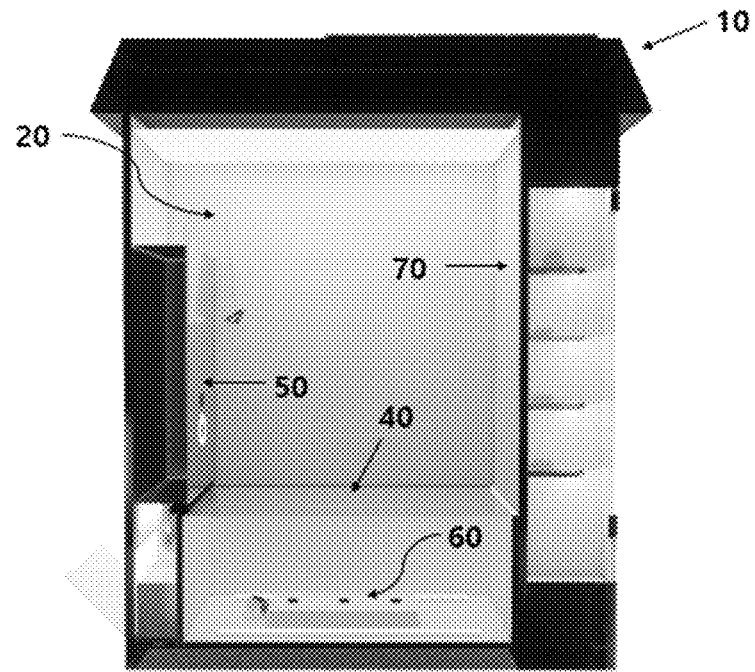

FIGS. 2a and 2b are perspective views of the shooting room (20) from each side of the exterior side of the photographic device for pets (10) according to one embodiment of the present invention. Referring to FIG. 2a, the shooting room (20) inside the photographic device for pets (10) of the present invention is provided with the main console (30) on one side, the shooting platform (40) parallel to the main console (30) on the other side, and a shooting unit for shooting is provided around the shooting platform. A user who enters the shooting room (20) places the main console (30) in front of the user and operates it to take pictures.

By operating the main console (30), the user can select various background colors or patterns and apply them to the background of the captured image. This may be accomplished by a software method of superimposing various pre-prepared background colors or patterns onto the captured image, or by including a separate screen on the wall surface (70) of the shooting room (20) and taking a photograph while various background colors or patterns are displayed on the screen by operation of the main console (30).

Referring to FIG. 2b, the photographic device for pets (10) of the present invention includes a bottom shooting unit (60) positioned inside the shooting platform (40), and a frontal shooting unit (50), positioned perpendicular to the upper surface of the shooting platform (40).

Figure 3A:
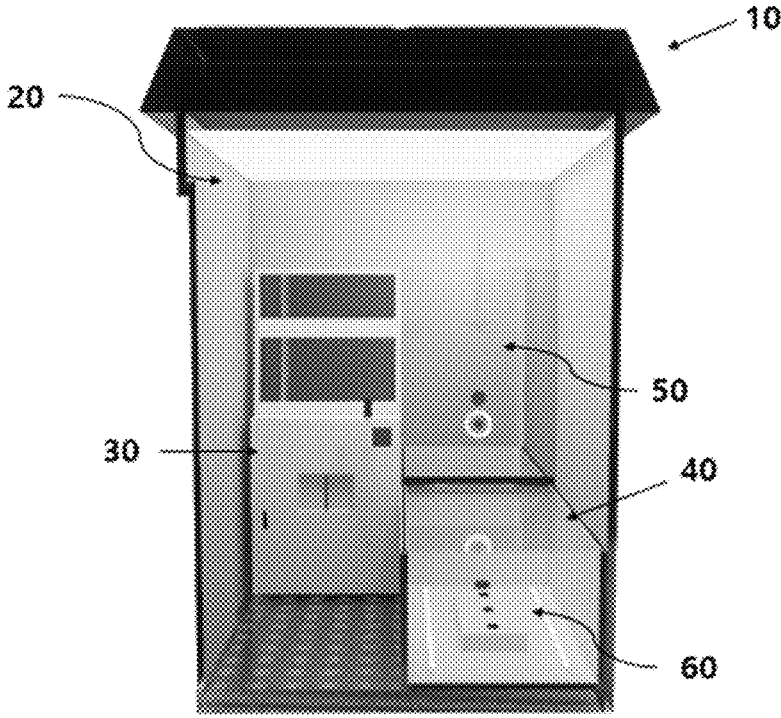
FIGS. 3a and 3b are images illustrating a perspective view from the front side of the interior of the photographic device for pets according to the present invention.
Figure 3B:
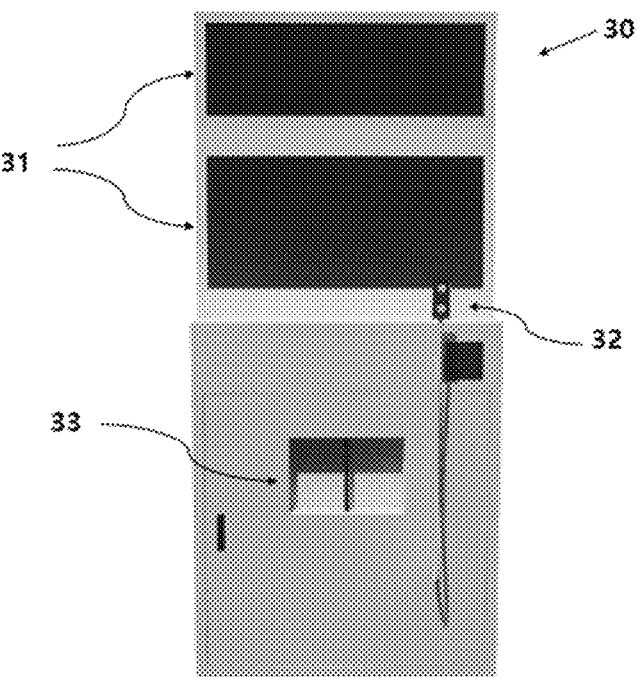

FIGS. 3a and 3b are images illustrating a front view of the shooting room (20) inside the photographic device for pets (10), according to one embodiment of the present invention. FIG. 3A shows a frontal view of the entire shooting room (20), and FIG. 3B shows a frontal view of the main console (30).

The exterior of the main console (30) includes a screen (31), a payment unit (not shown), a remote control (32), a photo output unit (not shown), and a photo outlet (33). Also on the inside of the main console (30) is a control unit (not shown), which is connected to the main console (30) and controls all operations of the photographic device for pets (10) of the present invention, including payment, taking pictures, adjusting the angle of taking pictures, changing the background of pictures, operating the remote control, generating sounds and vibrations, selecting, storing, retouching, printing and ejecting pictures, and transmitting picture datafiles to the mobile application.

The screen (31) serves to provide the image captured by the lens for previewing the final image of the pet photo to be provided, and to provide information necessary for taking the photo, and may preferably be designed with a touch function so that the user can enter the operations necessary for taking the photo directly on the screen. Alternatively, some or all of the operational inputs required for taking photographs may be performed by the remote control (32) equipped with the main console (30), or by separate levers or buttons located on the periphery of the main console (30).

The payment unit may be configured to employ any of the common payment methods employed by conventional unattended vending machines, including cash payment, card payment, loyalty payment, and the like.

The photo output unit comprises a photo printing unit for printing the taken photo on paper and delivering the printed photo to the photo outlet (33), and a transmission unit for transmitting the datafile of the taken photo to the user's mobile application.

A user who enters the photographic device for pets (10) according to the present invention places the main console (30) in front of the user, and takes photos of the pets by conducting operations such as taking pictures, adjusting the angle of taking pictures, changing the background of pictures, etc., while viewing the images to be taken on the screen (31).

The photographs taken by the user are printed in the photo printing unit located at the photo output unit and delivered to the photo outlet (33) for supply to the user. Alternatively, at the option of the user, the datafile of the photo taken may be transmitted to the user's mobile application from the transmission section located at the photo output unit. The printing of the photograph or the transmission of the datafile of the photograph may be carried out by any conventional methods known in the art to which the present invention belongs.

Figure 4:
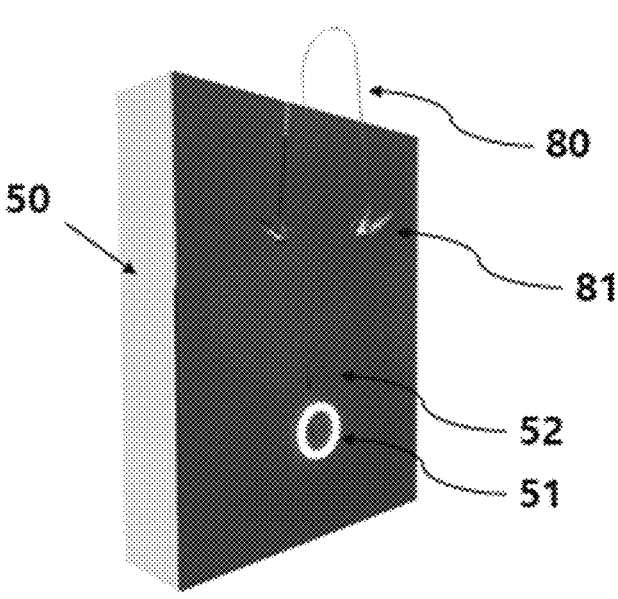
FIG. 4 is an image illustrating a frontal shooting unit of the photographic device for pets according to the present invention.

FIG. 4 is an image illustrating a frontal shooting unit (50) provided in the internal shooting room (20) of the photographic device for pets (10) according to one embodiment of the present invention. The frontal shooting unit (50) comprises a frontal lens (51) and a frontal speaker (52) near the frontal lens. The front of the frontal shooting unit (50) is configured in the form of a mirror to attract the attention of the pet.

A pet entering the shooting room (20) of the photographic device for pets (10) of the present invention is positioned on the shooting platform (40) with the frontal shooting unit (50) in front of it, and a frontal photograph of the pet is taken through the frontal lens (51). The frontal speaker (52) positioned near the frontal lens (51) and a mirror positioned in front of the frontal shooting unit (50) are intended to direct the pet's gaze toward the frontal lens. The frontal speaker (52) outputs sound by operation of the main console (30). The sound output can be animal sounds, bells, music, etc., and is not particularly limited as long as it can attract the pet's attention.

The user can adjust the shooting angle of the frontal lens (51) to take a picture in a desired composition. Furthermore, a plurality of frontal lenses (51) may be installed at appropriate locations on the frontal shooting unit (50), and the user may select the lens through which the desired composition of the photograph is taken while viewing the image on the screen (31).

The frontal shooting unit (50) of the photographic device for pets (10) of the present invention may be provided with a mounting unit (80). The mounting unit (80) may hold an object (81) that guides the pet's gaze between the frontal shooting unit and the shooting platform. The mounting unit (80) may be configured to have one end fixed to the frontal shooting unit (50) and the other end for hanging the object (81). The object (81) mounted on the mounting unit (80) may be positioned such that it is not in the field of view of the frontal lens (51) but may be positioned such that the pet's eye is drawn to the vicinity of the frontal lens (51). It is also possible to construct the mounting unit (80) from an elastic material, and to impart vibrations to one end of the mounting unit (80) so that the object (81) mounted on the other end can be manipulated to move randomly to attract the attention of the pet. The shape of the object (81) is not particularly limited as long as it is capable of attracting the attention of the pet. The object (81) may comprise a toy doll, feather, blade of grass, bell capable of making a sound, or the like.

Figure 5A:
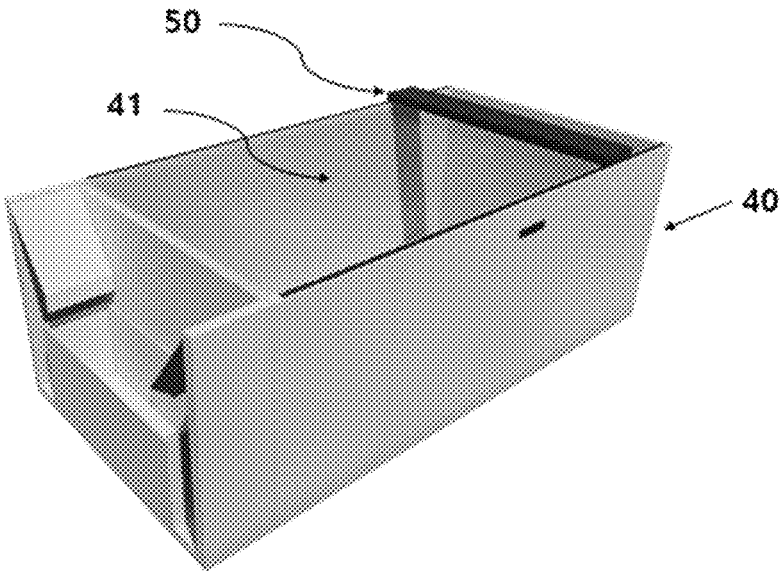
FIGS. 5a through 5d are images illustrating a shooting platform of the photographic device for pets according to the present invention.

FIGS. 5a through 5d are images illustrating a side view and a top view of the shooting platform (40) of the photographic device for pets (10) according to one embodiment of the present invention. Referring to FIG. 5a, the shooting platform (40) of the photographic device for pets (10) of the present invention has a glass upper surface (41), and a pet can be positioned on the upper surface (41) of the shooting platform (40).

Figure 5B:
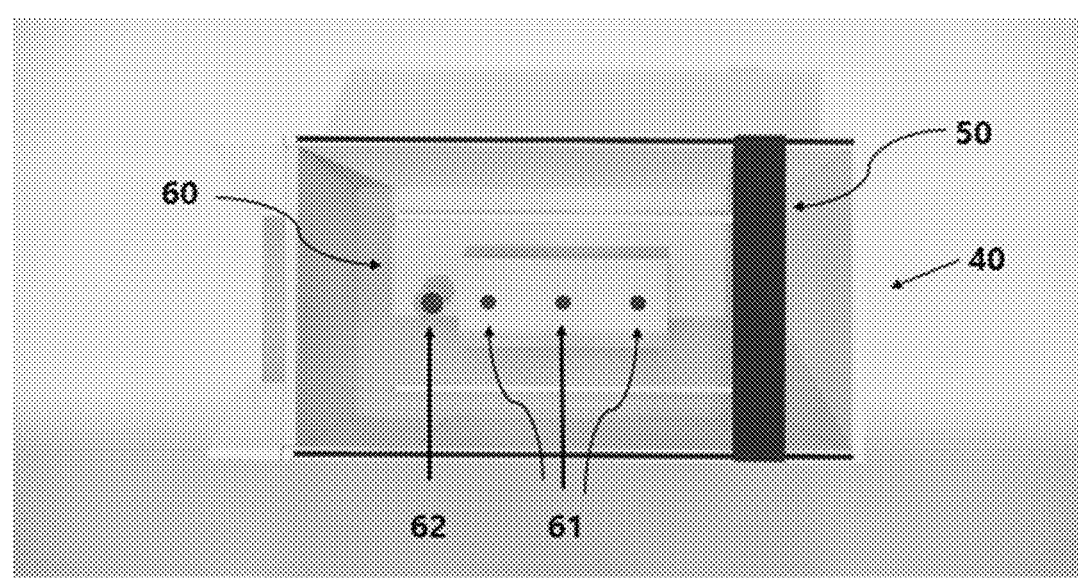
Figure 5C:
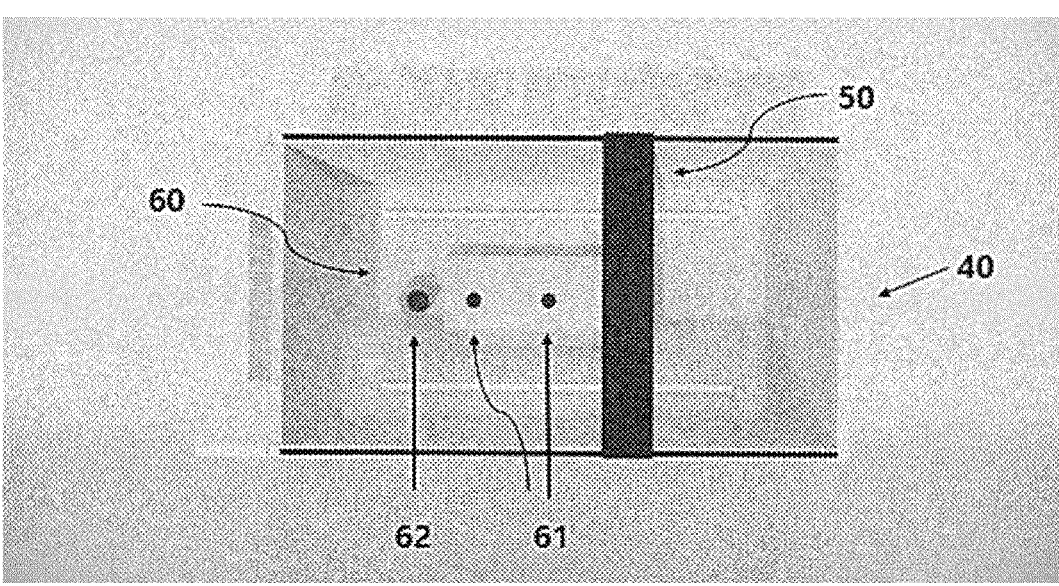

Referring to FIGS. 5b and 5c, the shooting platform (40) of the photographic device for pets (10) of the present invention includes a frontal shooting unit (50) and a bottom shooting unit (60). The frontal shooting unit (50) is positioned perpendicular to the upper surface (41) of the shooting platform (40). The frontal shooting unit (50) can be moved back and forth on the upper surface (41) of the shooting platform (40) by a user, thereby adjusting the distance to the pet positioned on the upper surface (41) of the shooting platform (40) to take a photo with a suitable composition. The bottom shooting unit (60) is located in the interior space of the shooting platform (40) and includes a bottom lens (61) and a bottom speaker (62). The role of the bottom speaker (62) is not particularly different from the role of the frontal speaker (52) and can be operated independently of the operation of the frontal speaker (52).

The upper surface (41) of the shooting platform comprises glass, such that a bottom lens (61) positioned in the interior space (42) of the shooting platform can photograph a pet present on the top of the upper surface glass. The user can adjust the shooting angle of the bottom lens (61) to take a photo with a desired composition.

Furthermore, the bottom lens (61) may be installed in a plurality of suitable locations on the bottom shooting unit (60), and the user may select the lens through which the desired composition of the photograph is taken while checking the image on the screen (31).

The shooting unit used in the photographic device for pets (10) of the present invention may comprise a lens for 3D specialty photography. When the shooting unit used in the photographic device for pets (10) of the present invention comprises a 3D specialty lens, the pet photograph taken can be provided to the user in the form of a three-dimensional image. It is sufficient to use a 3D specialty lens that is well known in the technical field to which the present invention belongs.

Figure 5D:
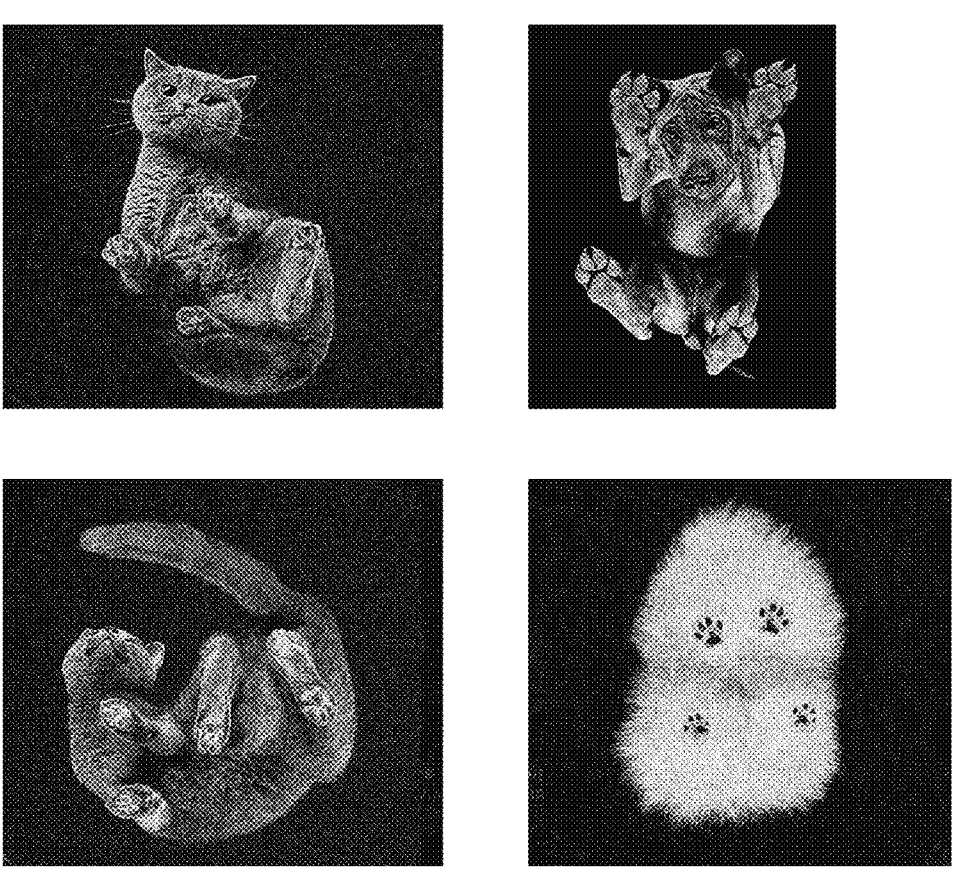

The photographic device for pets (10) of the present invention may comprise a vibration unit in the lower part of the shooting platform (40) at a certain position in the interior space (42). The vibration unit can be vibrated by operation of the main console to direct the pet's gaze downward while with the pet is photographed from the bottom shooting unit (60). The photographs taken by the bottom shooting unit (60) of the photographic device for pets (10) of the present invention may be the ones including the bottom view and the face view of the pet. Given the characteristics of quadrupedal animals, photographing from the below allows for easy capture of the underside of the paw and the underside of the face, especially the nose part. Pet photographs that emphasize the paws of pets are distinctive and can enhance the commercial value of the photographic device for pets (10) of the present invention, as it is difficult to obtain such images from home or conventional studio photography. Additionally, the nose of a pet photographed in high definition can serve a role similar to human fingerprints, and can be utilized as big data, such as identification data for pet registration cards. An example of a pet photo taken from the bottom is shown in FIG. 5d.

Figure 6A:
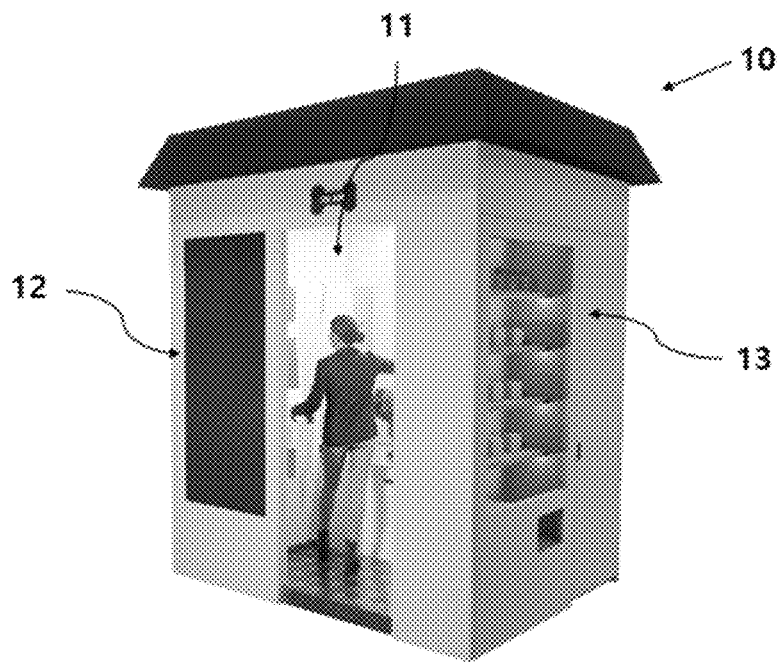
FIGS. 6a and 6b are images illustrating an exterior view of the photographic device for pets according to the present invention.
Figure 6B:
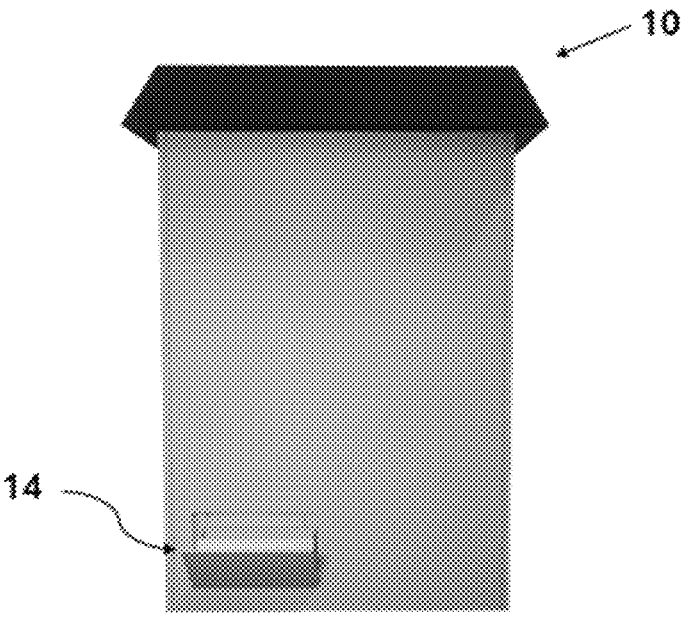

FIGS. 6a and 6d are images illustrating an exterior view of the photographic device for pets (10) according to one embodiment of the present invention. Referring to FIG. 6a, the photographic device for pets (10) of the present invention may comprise an entrance (11) on one side of the exterior and an advertising monitor (12) on one side of the exterior. Further, the photographic device for pets (10) of the present invention may include a vending machine (13) on one side of the exterior. Referring to FIG. 6b, the photographic device for pets (10) of the present invention may include a trash receptacle (14) on one side of the exterior. Any two or more of the entrance (11), the advertising monitor (12), the vending machine (13), or the trash receptacle (14) may be located on the same side, or all may be located on different sides.

The photographic device for pets (10) of the present invention may comprise a vending machine (13) where users can purchase various pet products, such as poop bags, treats, toys, photography props, and the like, and may attract to the user's attention by utilizing the advertising monitor (12). Furthermore, the vending machine (13) and/or the advertising monitor (12) of the photographic device for pets (10) of the present invention may generate additional earnings other than the income from photography.

The present invention is not limited to the above embodiments, and it will be apparent to one having ordinary skill in the art to which the present invention belongs that various modifications or variations may be made without departing from the technical essence of the invention.

DESCRIPTION OF REFERENCE NUMERALS

10: Photographic device for pets
11: Entrance
12: Advertising monitor
13: Vending machine
14: Automatic trash receptacle
20: Shooting room
30: Main console
31: Screen
32: Remote control
33: Photo outlet
40: Shooting platform
41: Upper surface
42: Interior space
50: Frontal shooting unit
51: Frontal lens
52: Frontal speaker
60: Bottom shooting unit
61: Bottom lens
62: Bottom speaker
70: Wall surface
80: Mounting unit
81: Object

9

10

What is claimed is:

1. A photographic device for pets capable of taking solo photos of pets, characterized by comprising:

a shooting room formed inside the photographic device;

a main console provided within the shooting room;

a shooting platform where a user can place a pet;

at least one shooting unit comprising a lens for photographing the pet; and a control unit, connected to the main console, for controlling an operation of the photographic device, wherein the shooting unit comprises:

a frontal shooting unit positioned in front of an upper surface of the shooting platform comprising a plurality of frontal lenses capable of photographing the pet from a frontal view; and a bottom shooting unit positioned on an interior side of the shooting platform comprising a plurality of bottom lenses capable of photographing the pet from a bottom view;

wherein the shooting unit is provided adjacent to one side of the main console, wherein a desired lens can be selected to take a photograph from the plurality of frontal lenses of the frontal shooting unit and the plurality of bottom lenses of the bottom shooting unit by operation of the main console, wherein the main console comprises a screen, a payment unit, a photo output unit, and a photo outlet, wherein the main console controls the operation of taking photographs, the viewing of the photographs taken, and the photo output, wherein an image captured by the frontal lens of the frontal shooting unit and the bottom lens of the bottom shooting unit is projected onto the screen equipped with the main console, and wherein the photographic device further comprises at least one of the following:

a speaker disposed near the frontal lenses, the bottom lenses, or both, capable of outputting sound by operation of the main console to guide a gaze of the pet to the frontal view or bottom view;

a vibration unit at the lower part of the shooting platform, capable of generating vibrations by operation of the main console to guide the gaze of the pet to the bottom view; and a mounting unit for mounting an object that guides the gaze of the pet between the frontal shooting unit and the shooting platform, disposed on the frontal shooting unit.

2. The photographic device for pets of claim 1, characterized in that the photographic device is equipped with a shooting angle adjustment unit for adjusting the shooting angle of the frontal lenses of the frontal shooting unit and the bottom lenses of the bottom shooting unit.

3. The photographic device for pets of claim 1, characterized in that the main console further comprises a remote control, wherein the remote control is used to perform some or all of input functions of the main console.

4. The photographic device for pets of claim 1, characterized in that background colors or patterns can be selected for the background of the captured image by operation of the main console.

5. The photographic device for pets of claim 2, characterized in that the photographic device is equipped with a movement means for moving the frontal shooting unit back and forth to adjust a distance to the pet positioned on the upper surface of the shooting platform.

6. The photographic device for pets of claim 2, characterized in that the main console further comprises a remote control, wherein the remote control is used to perform some or all of input functions of the main console.

7. The photographic device for pets of claim 2, characterized in that background colors or patterns can be selected for the background of the captured image by operation of the main console.

8. The photographic device for pets of claim 5, characterized in that the photo output unit of the main console comprises a photo printing unit for printing the photos taken onto paper and delivering the printed photos to the photo outlet, and a transmission unit for transmitting a datafile of the photos taken to a mobile application of the user.

9. The photographic device for pets of claim 5, characterized in that the main console further comprises a remote control, wherein the remote control is used to perform some or all of input functions of the main console.

10. The photographic device for pets of claim 5, characterized in that background colors or patterns can be selected for the background of the captured image by operation of the main console.

11. The photographic device for pets of claim 8, characterized in that the main console further comprises a remote control, wherein the remote control is used to perform some or all of input functions of the main console.

12. The photographic device for pets of claim 8, characterized in that background colors or patterns can be selected for the background of the captured image by operation of the main console.

* * * * *